US008711591B2

(12) United States Patent
Jonsson et al.

(10) Patent No.: US 8,711,591 B2
(45) Date of Patent: Apr. 29, 2014

(54) AC/DC CONVERTER

(75) Inventors: Tomas U Jonsson, Västerås (SE);
Anshuman Shukla, Västerås (SE);
Staffan Norrga, Stockholm (SE);
Kalpesh Hirjibhai Bhalodi, Bangalore
(IN); Praveen Kumar Barupati,
Warangal (IN); Subhasish Mukherjee,
Halisahar (IN); **Sasitharan
Subramanian**, Kolanalli (IN)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 13/643,985

(22) PCT Filed: May 11, 2010

(86) PCT No.: PCT/EP2010/056501
§ 371 (c)(1),
(2), (4) Date: Dec. 5, 2012

(87) PCT Pub. No.: WO2011/141059
PCT Pub. Date: Nov. 17, 2011

(65) Prior Publication Data
US 2013/0070495 A1 Mar. 21, 2013

(51) Int. Cl.
H02M 7/04 (2006.01)
(52) U.S. Cl.
USPC .......................................................... 363/84
(58) Field of Classification Search
USPC ................................ 363/34–37, 127, 129–134
See application file for complete search history.

(56) References Cited

U.S. PATENT DOCUMENTS

| 6,236,580 B1 * | 5/2001 | Aiello et al. | 363/37 |
| 6,411,067 B1 * | 6/2002 | Bjorklund | 323/207 |
| 6,519,169 B1 * | 2/2003 | Asplund et al. | 363/132 |
| 2008/0205093 A1 | 8/2008 | Davies et al. | |

FOREIGN PATENT DOCUMENTS

| WO | WO 00/62409 A1 | 10/2000 |
| WO | WO 2007/028349 A1 | 3/2007 |
| WO | WO 2009/030275 A1 | 3/2009 |

OTHER PUBLICATIONS

Feldman, et al., "A Hybrid Voltage Source Converter Arrangement for HVDC Power Transmission and Reactive Power Compensation", Proceedings 5th IET International Conference on Power Electronics, Machines and Drives, Apr. 19, 2010, Vol. XP002629574, pp. 1-6.

* cited by examiner

Primary Examiner — Adolf Berhane
Assistant Examiner — Yemane Mehari
(74) Attorney, Agent, or Firm — Birch, Stewart, Kolasch & Birch, LLP

(57) ABSTRACT

The present invention relates to an AC/DC converter comprising at least two phase legs connected in series between first and second DC connection terminals of the AC/DC converter, wherein each phase leg comprises: an AC connection having first and second terminals arranged to connect the phase leg to a phase of an AC system; a phase branch comprising at least one converter cell and having first and second branch end terminals; and a capacitor. The capacitor is connected the between the first branch end terminal and the first AC connection terminal, so that the capacitor forms a DC blocking capacitor. The second AC terminal is connected to the second branch end terminal. The series connection of the phase legs between first and second DC connection terminal is such that a first series connection point in a phase leg is located between the first branch end terminal and the capacitor, while a second series connection point is located between the second branch end terminal and the second AC connection. The invention further relates to a method of operating such AC/DC converter.

22 Claims, 12 Drawing Sheets

Fig. 10a
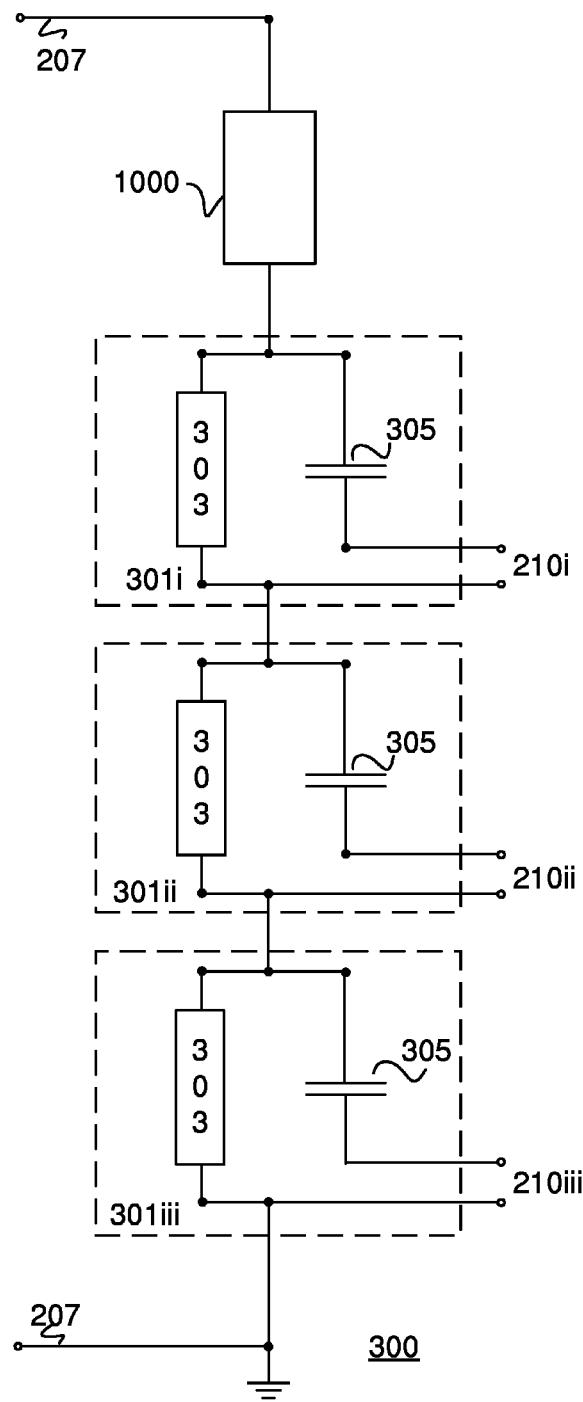
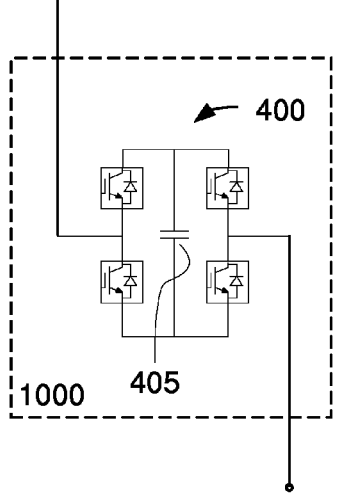
Fig. 10f

US 8,711,591 B2

AC/DC CONVERTER

TECHNICAL FIELD

The present invention relates to the field of power conversion, and in particular to the conversion between a DC power and an AC power of two or more phases.

BACKGROUND

High Voltage Direct Current (HVDC) transmission of power has proved to be an efficient alternative to Alternating Current (AC) transmission in many power transmission situations. Typically, in an HVDC power transmission system, an AC/DC converter operating as a rectifier connects an AC power source to one end of an HVDC transmission line, and an AC/DC converter operating as an inverter connects the another end of the HVDC transmission line to an AC grid. Several HVDC transmission lines may be interconnected to form an HVDC transmission network. The higher the voltage used on an HVDC transmission line, the lower will the transmission losses be. Hence, a high voltage transmission is often desirable, in particular when power is transmitted over longer distances. A high voltage across the HVDC transmission line will allow for low-loss transmission of high power.

An AC/DC converter for connecting an AC grid or power source of two or more phases to a DC transmission line typically has one phase leg per AC phase, where a phase leg is arranged to synthesize a sinusoidal voltage waveform from a DC voltage. For high power applications, the phase legs of an AC/DC converter are typically connected in parallel on the DC side.

However, in some applications, it might be desirable to connect an AC grid or power source of lower power to an HVDC transmission line. The voltage withstanding requirements on an AC/DC converter interconnecting an AC system of lower power to an HVDC transmission line will be the same as the voltage requirements on an AC/DC converter interconnecting an AC system of higher power to the same HVDC transmission line, whereas the current with-standing requirements will be lower.

In U.S. Pat. No. 6,519,169, an AC/DC converter having a series connection of phase legs is disclosed. By connecting the phase legs in series, the voltage that each phase leg has to withstand for a particular DC voltage will be reduced compared to an AC/DC converter wherein the phase legs are connected in parallel. For an AC/DC converter having a number P of AC phases, the voltage withstanding requirement on each phase leg will be $U_{DC}/P$, where $U_{DC}$ is the DC voltage at the DC connection of the AC/DC converter. Thus, the component cost of the AC/DC converter will typically be reduced by connecting the phases in series.

In US 2008/0205093, an AC/DC converter having a series connection of phase legs is proposed, where each phase leg has two parallel cascades of series connected converter cells.

SUMMARY

An object of the present invention is to provide a cost-efficient AC/DC converter for high voltage applications for which the power requirements are less strict.

One embodiment provides an AC/DC converter comprising at least two phase legs connected in series between first and second DC connection terminals of the AC/DC converter. Each phase leg comprises an AC connection having first and second terminals arranged to connect the phase leg to a phase of an AC system; a phase branch comprising at least one converter cell and having first and second branch end terminals; and a capacitor. The capacitor is connected the between the first branch end terminal and the first AC connection terminal, so that the capacitor forms a DC blocking capacitor; and the second AC terminal is connected to the second branch end terminal. The series connection of the phase legs between first and second DC connection terminal is such that a first series connection point in a phase leg is located between the first branch end terminal and the capacitor, while a second series connection point is located between the second branch end terminal and the second AC connection.

This embodiment provides an efficient AC/DC converter which can be obtained at reduced cost with maintained performance compared to existing solutions. For example, the current rating of converter cell valves can be halved at maintained power rating compared to an AC/DC converter having series connected phase legs, each having a single phase branch and a parallel connected DC capacitor branch, and wherein an AC phase output is provided between the midpoints of the phase branch and the DC capacitor branch (cf. U.S. Pat. No. 6,519,169). Compared to an AC/DC converter having two parallel branches, the midpoints of which are connected to an AC connection (cf. US 2008/0205093), the number of valves required can be halved at maintained power rating, with maintained voltage rating of the valves. Thus, the total voltage rating of the AC/DC converter disclosed herein can be halved compared to such known AC/DC converter.

The phase branch of a phase leg may comprise a cascade of series connected, independently switchable converter cells, whereby a multilevel output voltage from the phase branch can be obtained. Less filtering of the output AC voltage will thereby be required. A phase branch could include one such cascade, or a parallel connection of at least two cascades. By a parallel connection, it is achieved that a higher current rating of the AC/DC converter can be obtained with the same type of components in the converter cells.

The AC/DC converter could advantageously comprise a control system configured to control the switching of the converter cells of the phase branch of a phase leg to provide a voltage according to the following expression between the first and second series connections points of a phase leg:

$$U_k = U_k^{DC} + \hat{U}_v^{AC} \sin(\omega t + \Theta_k),$$

where k indicates the $k^{th}$ phase leg, $k \in [1, P]$, P being the number of phases of the AC/DC converter 300; $U_k^{DC}$ denotes a predetermined desired DC voltage between the first and second series connection points, where $\Sigma_{k=1}^{P} U_k^{DC} = U^{DC}$, $U^{DC}$ being the voltage between the DC connection terminals; $\hat{U}_v^{AC}$ is a desired peak AC voltage between the first and second connection points, t is time, $\omega$ is the desired angular frequency at the AC output and $\Theta_k$ is the desired phase angle. Oftentimes, the predetermined DC voltage is set to $U^{DC}/P$, by which is achieved that the phase leg voltages will be balanced.

The AC/DC converter can for example comprise a voltage measurement device arranged to measure at least one voltage from which the voltage across the capacitor of the phase leg may be obtained. The control system can then advantageously be responsively connected to the voltage measurement device and configured to receive a signal from the voltage measurement device from which the voltage across the DC-blocking capacitor may be obtained. In this embodiment, the control system is configured to perform the control of the switching of the converter cells of the phase branch in dependence of the received voltage measurement signal so that the DC voltage across the DC-blocking capacitor of a phase leg corresponds to a predetermined capacitor DC voltage. Hereby can be achieved that no DC currents will enter an AC system connected to the AC connections of the phase legs. Such predetermined capacitor DC voltage often equals the predetermined DC voltage between the first and second series connection points mentioned above, and can advantageously be set to $U^{DC}/P$ in order to have the phase leg voltages balanced.

The control system may furthermore be configured to receive a signal indicative of a zero sequence component of the AC output voltage from the AC/DC converter; and to control the switching of at least one converter cell of the AC/DC converter to mitigate DC side common mode harmonic current components which would otherwise be caused by such zero sequence component. Such at least one converter cell could for example be the converter cells of the phase branches of the phase legs, or at least one converter cell of an active filter connected in series with the phase legs between the terminals of the DC connection. In the former case, if the AC connection of a phase leg is connected to a first winding of a transformer in a Y connection, the neutral of the second winding of the transformer can advantageously be connected to a grounded arrester, the neutral thus being floating. Hereby it is achieved that any voltage generated at the AC connection by such zero sequence component mitigation will appear across the arrester, and will hence not be transferred to the AC system.

The AC/DC converter may include further components, such as a passive filter, e.g. a reactor, connected in the phase leg circuit between the first and second series connection points. In case of an excessive short circuit or earth fault current from an HVDC system to which the AC/DC converter is connected, it may be that the DC-blocking capacitor may not be able to withstand the current, and that a current discharge through the DC-blocking capacitor, or via an arrester, if any, occurs. By providing a passive filter in the phase leg circuit between the first and second series connection points, the current increase rate, and thereby the damaging effect of such short circuit or earth fault currents, may be reduced.

Such filter can for example be connected at the same side of the series connection points as the phase branch, or at the same side of the series connection points as the capacitor. If such filter is connected on the same side as the phase branch, the filter will contribute to the DC side reactance of the AC/DC converter. Such passive filter will for example contribute to the mitigation of common mode currents originating from a non-zero zero sequence components.

The present invention furthermore relates to a method of operating an AC/DC converter.

Further aspects of the invention are set out in the following detailed description and in the accompanying claims.

BRIEF DESCRIPTION OF THE DRAWINGS

FIG. 10a is a schematic illustration of an embodiment of the AC/DC converter of FIG. 3, wherein an active filter is connected in series with the phase legs.

FIG. 10b-f are schematic illustrations of different embodiments of the active filter shown in FIG. 10a.

DETAILED DESCRIPTION

Figure 1:
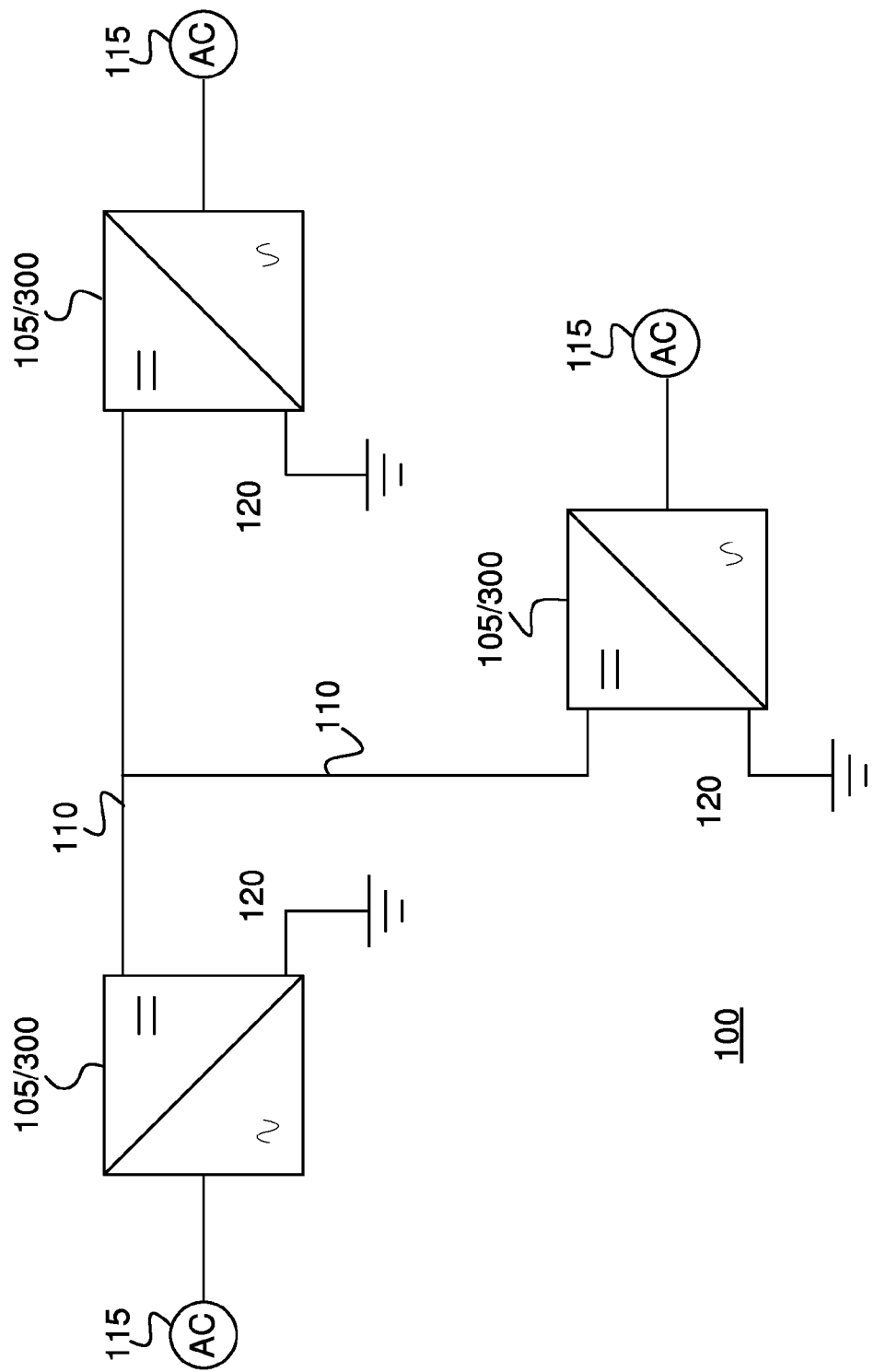
FIG. 1 is a schematic illustration of an HVDC transmission system.

FIG. 1 illustrates an example of an HVDC transmission system 100, wherein three AC/DC converters 105/300 are shown to be interconnected via HVDC transmission lines 110. To each of the AC/DC converters 105/300 is connected an AC system 115. An AC system 115 can be an AC grid to which power is provided via the HVDC transmission lines 110, or an AC power source providing power to be transmitted via HVDC transmission lines 110. An AC system 115 could for example be arranged so that it can be an AC power source at one time, and an AC grid at another time. In such configuration, the AC/DC converter 105/300 to which the AC system 115 is connected would be a bidirectional converter arranged to be able to operate as either an inverter or a rectifier.

HVDC transmission system 100, or HVDC system 100 for short, is shown to be a monopolar system, where grounded electrode lines 120 are used for the return current. However, HVDC system 100 of FIG. 1 is shown as an example only. The present technology is equally applicable to a bipolar HVDC transmission system 100 where additional transmission lines 110 are used for the return current. Furthermore, the present technology is applicable to any power system having any number M of AC/DC converters, including M=1.

While the different AC/DC converters 105/300 connecting the different AC systems 115 to the HVDC transmission lines 110 are typically subject to the same DC voltage, the power requirements of the different AC systems 115 interconnected by the HVDC transmission lines 110 may vary. For example, one of the AC/DC converters 105/300 of FIG. 1 could be a converter 105/300, used to transfer a low or mid-sized power to or from an HVDC transmission line 110 which interconnects main, high power, AC/DC converters 105/300 of the HVDC system 100.

Figure 2:
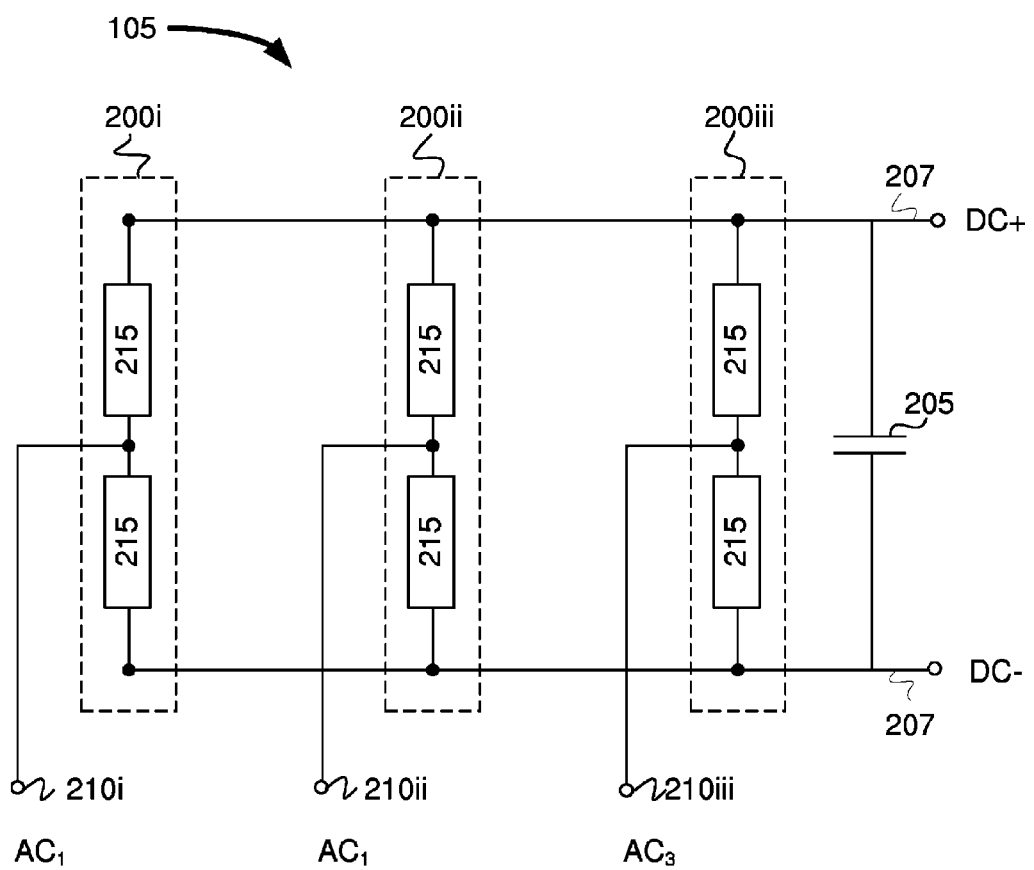
FIG. 2 is a schematic illustration of a three phase AC/DC converter wherein the phase legs are connected in parallel.

Although the power requirements may be lower for some of the AC/DC converters 105/300 of an HVDC system 100, all AC/DC converters 105/300 within an HVDC system 100 must typically be designed to withstand the full DC voltage of the HVDC transmission lines 110. An AC/DC converter 105/300 of two or more phases typically comprises one phase leg per AC phase of the AC system 115, where a phase leg is capable of synthesizing a sinusoidal voltage waveform from a DC voltage. An often used configuration of a three-phase AC/DC converter 105 is shown in FIG. 2, where three phase legs 200 are connected in parallel with a capacitor 205, over which a DC voltage may be applied via DC connection 207. The three phase legs 200 of FIG. 2 are denoted phase legs 200i, 200ii and 200iii, respectively. A phase leg 200 of AC/DC converter 105 of FIG. 2 comprises two series connected valve units 215, as well as an AC connection 210 at which the phase leg 200 provides or receives AC power (in FIG. 2, only one connector of AC connection 210 is shown, since, in the topology shown, the other end of the AC connection is grounded). The AC connection 210 is connected to the midpoint of the phase leg 200. The valve units 215 of a phase leg 200 may be controlled such that a three phase AC voltage is synthesized from a DC voltage applied across the capacitor 205. In the parallel configuration of FIG. 2, each phase leg 200 has to be designed to withstand the full DC voltage.

In U.S. Pat. No. 6,519,169 and in US 2008/0205093, three phase AC/DC converters have been disclosed wherein the phase legs of the AC/DC converter are connected in series. By connecting the phase legs in series, each phase leg will only have to withstand a third of the full DC voltage. Hence, in terms of voltage withstanding capabilities, the components of a phase leg in an AC/DC converter wherein the phase legs are connected in series can be of less costly design than the components in the parallel connection topology of FIG. 2.

According to the present invention, an AC/DC converter is provided wherein at least two phase legs, each having a phase branch comprising at least one switchable converter cell, are connected in series. The series of phase legs are connected between first and second DC connection terminals of the AC/DC converter, and each phase leg is provided with an AC connection. Each phase leg of the AC/DC converter further comprises a capacitor, which is connected between the first branch end terminal and a first terminal of the AC connection, thus operating as a DC-blocking capacitor. The second terminal of the AC connection is connected to the second branch end terminal. Hence, a series connection of the DC blocking capacitor and the AC connection is connected in parallel to the phase branch, and the AC voltage at the AC connection will basically correspond to the AC voltage provided across the entire phase branch of the phase leg (minus the voltage drop across the DC-blocking capacitor). The series connection of the phase legs is such that a first connection point in a phase leg is located between the first branch end terminal and the capacitor, while a second connection point is located between the second branch end terminal and the second AC connection. A phase leg of the AC/DC converter is equipped with a single phase branch.

A series connection of the phase legs as described in the preceding paragraph will hereinafter be referred to as a series connection of the phase legs on the DC side of the AC/DC converter, or simply as a series connection of the phase legs.

A series connection of the phase legs will result in a DC potential at the AC connections, where the difference in DC potential between two adjacent phases will typically be $U_{DC}/P$, $U_{DC}$ being the voltage across the DC connection 207 and P being the number of phases. In order to avoid that such DC potential is applied to the AC system 115, the AC connection of each phase leg can typically be connected to a winding of a transformer, the transformer thus forming a connection arranged to be connected to an AC system. Such transformer could advantageously be insulated to withstand at least the DC voltage appearing at the AC connection 210 during normal operation.

By providing a parallel connection of the phase branch and a series connection of a DC blocking capacitor and the AC connection, the maximum AC voltage across the AC connection can be doubled, using a single phase branch, as compared to an AC/DC converter having a single branch wherein one terminal of the AC connection is provided at the midpoint of the branch. Hence, the current rating of the components of the branch can, for a given AC power, be half that of the components of a mid-point-connected AC/DC converter.

By connecting a DC-blocking capacitor in series with the AC connection of each phase leg, an AC phase output that does not contain any DC component can be obtained by means of a single branch only. As compared to a AC/DC converter having two parallel branches and wherein the terminals of the AC connection are connected at a midpoint of the respective branches, the total voltage rating of the switching devices of a phase leg of the present AC/DC converter can, for a given DC voltage, be reduced to half, since only one branch is required. Thus, the total number of switching devices and/or the voltage withstanding capability of the employed switching devices may be reduced with maintained voltage rating of the AC/DC converter.

Figure 3:
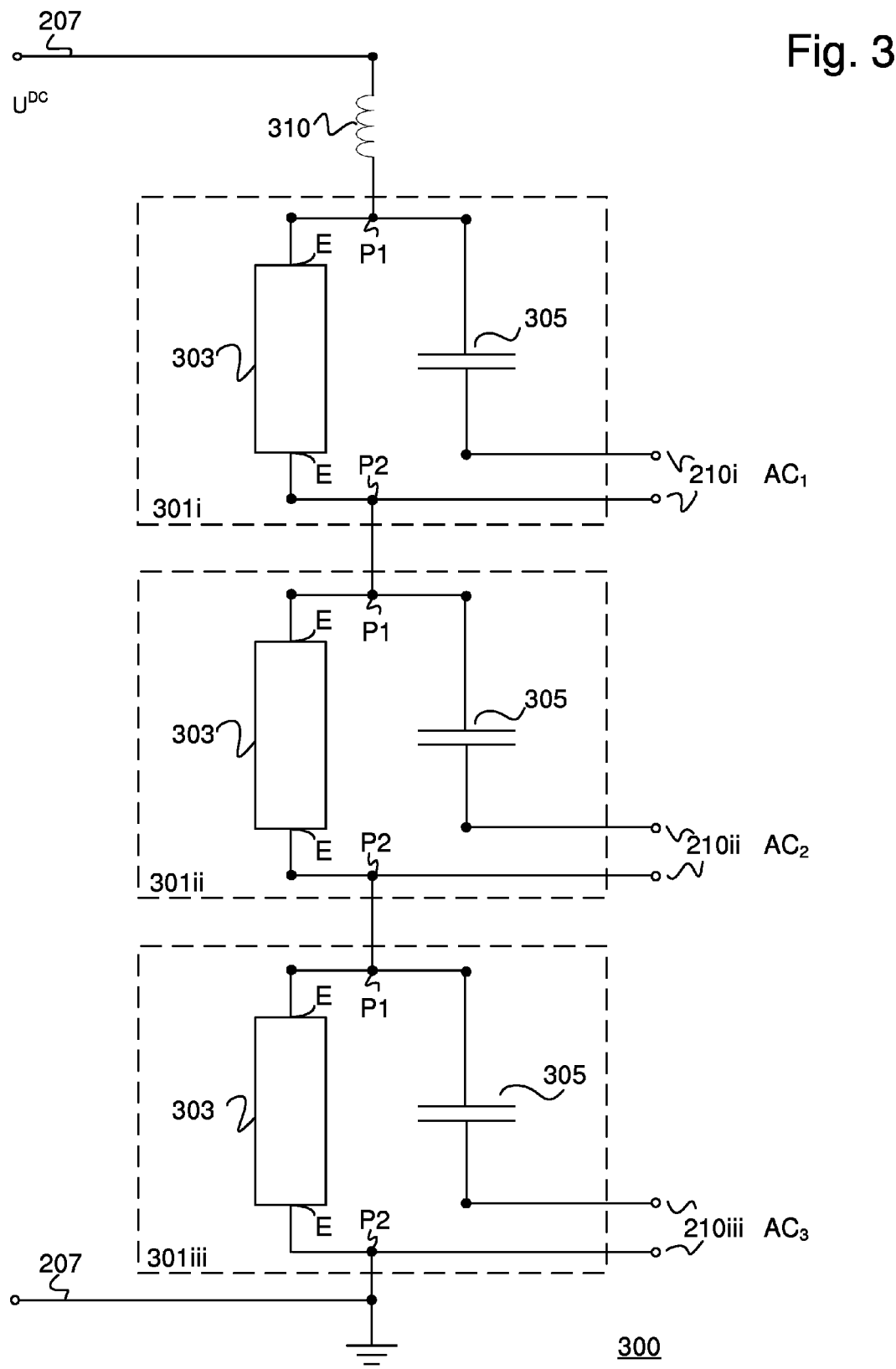
FIG. 3 is a schematic illustration of an example of a three phase AC/DC converter wherein, for each phase, a DC-blocking capacitor is connected in series with the AC connection, such series connection being connected in parallel with a phase branch of converter cells.

FIG. 3 schematically illustrates an example of a three phase AC/DC converter 300 having three phase legs 301i, 301ii and 301iii which are connected in series on the DC side between two poles of a DC connection 207, to which for example HVDC transmission lines 110 can be connected. The AC/DC converter 300 further has one AC connection per phase leg, denoted 210i, 210ii and 210iii, respectively, the AC connection having two AC connection terminals. When referring to any one (or all) of the phase legs 301i, 301ii and 301iii, the common term phase leg 301 will be used; when referring to any one (or all) of the AC connections 210i, 210ii and 210iii, the common term AC connection 210 is used, and so forth.

Each phase leg 301 of FIG. 3 comprises a phase branch 303 having at least one converter cell. A phase branch 303 has two branch end connection terminals E at the respective ends of the phase branch 303. In each phase leg 301 of the AC/DC converter 300 of FIG. 3, the phase branch 303 is connected (via end connection terminals E) in parallel with a series connection of a DC-blocking capacitor 305 and the AC connection 210.

The series connection of phase legs 301 between the two terminals of the DC connection 207 is such that a first connection point P1 in a phase leg is located between the first branch end terminal E and the capacitor 305, while a second connection point P2 is located between the second branch end terminal E and the second terminal of AC connection 210.

In order to limit any fault currents occurring in an HVDC system 100 to which the AC/DC converter 300 is connected, the AC/DC converter 300 could for example include a passive filter, including for example a reactor and possibly further components, in series with the phase legs 301 and the poles of the DC connection 207. Such passive filter, formed by a reactor 310, is shown in FIG. 3. A passive filter connected in series with the phase legs 301 and the poles of the DC connection 207 will be referred to as a DC line filter 310, of which reactor 310, referred to as DC line reactor 310, forms one embodiment.

A phase branch 303 can be formed of a single converter cell, or of a series connection of two or more independently switchable converter cells arranged in a cascaded fashion. By using a cascade of series connected converter cells it is achieved that multiple voltage levels can be obtained at the AC side of a phase leg 301, so that a more smooth synthesization of an AC-voltage can be obtained than if a phase branch 303 formed from a single converter cell is used. Thus, less filtering components will be required if the phase branch 303 comprises a cascade of converter cells than if a single converter cell is used as the phase branch 303. Series connection of a set of independently switchable converter cells in an AC/DC converter has been proposed in DE 10103031, where it was shown that a set of independently switchable converter cells can provide multilevel switching.

The converter cells of a phase branch 303 can be half-bridge converter cells, full-bridge converter cells, or a combination of half-bridge and full-bridge converter cells. Converter cells are well known in the art and will only be briefly discussed here. A half-bridge converter cell comprises two series connected electric valve units 215 forming what may be referred to as a cell element, which is connected in parallel with a cell capacitor in a half-bridge configuration. A full-bridge converter cell comprises two such cell elements, both connected in parallel with a cell capacitor in a full-bridge, or H-bridge, fashion. An electric valve 215 can advantageously include a unidirectional switch, or switch for short, and an anti-parallel diode, where the unidirectional switch can be controlled to switch off, as well as to switch on.

Depending on the switching state of the valves 215 of a converter cell, the voltage across a converter cell can take one of two (half-bridge cell) or three (full-bridge cell) different values. In a half-bridge converter cell, the two values are 0 and +Uc, or 0 and –Uc, (depending on which of two equivalent half-bridge topologies is used), where Uc is the voltage across the cell capacitor. In a full-bridge converter cell, the three values are +Uc, 0 and –Uc. The cell capacitor of a converter cell serves a similar purpose to the capacitor 205 of the converter configuration shown in FIG. 2. The switching state of a valve 215 of a converter cell can for example be controlled by a sending a switch control signal (e.g. a Pulse Width Modulation (PWM) signal) to the switch of the valve 215. A drive unit is typically provided for sending such switch control signals.

Figure 4A:
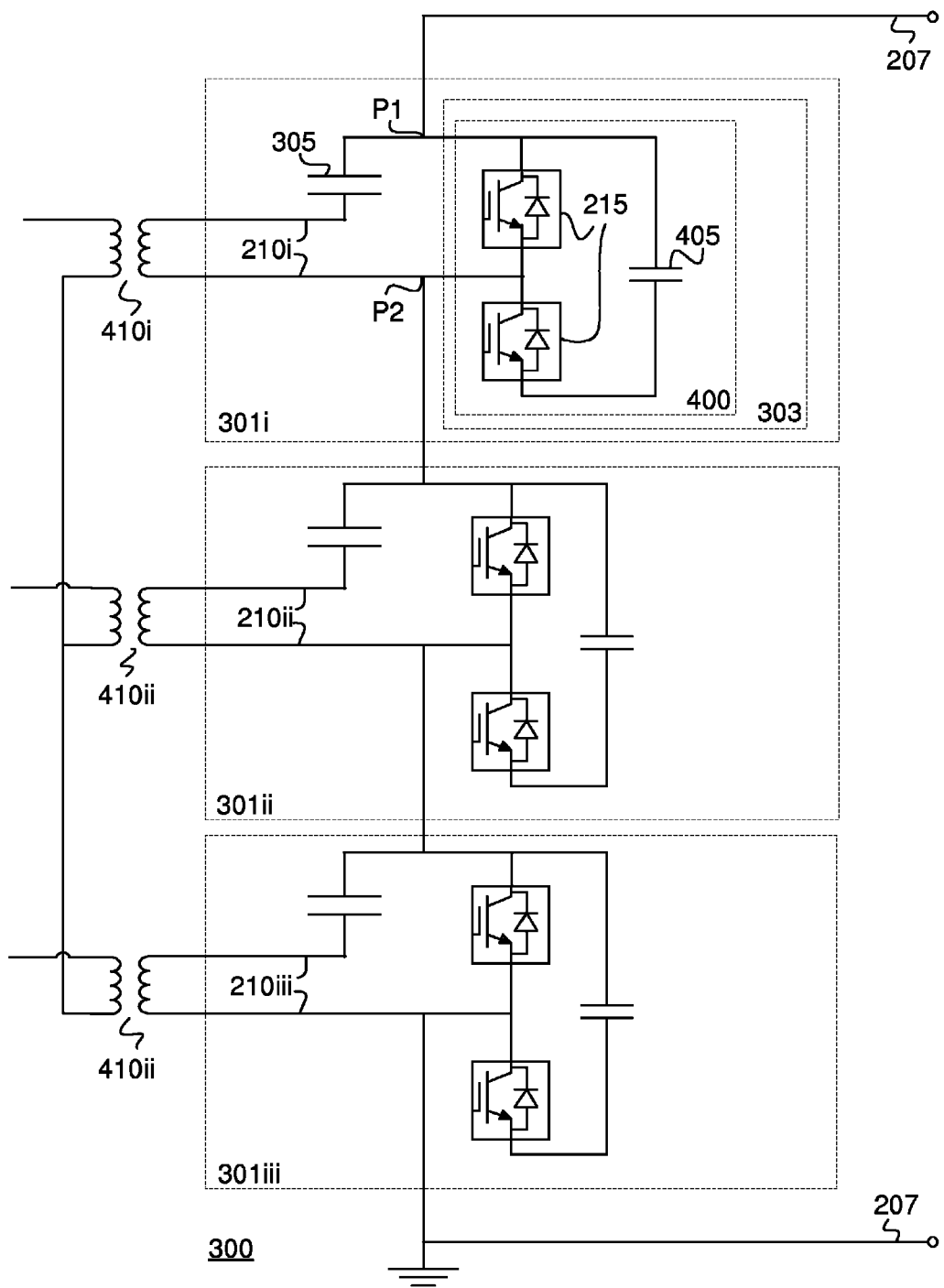
FIG. 4a is a schematic illustration of an embodiment of a three phase AC/DC converter according FIG. 3 wherein a phase branch comprises a single converter cell.

An example of an embodiment of a three-phase AC/DC converter 300 wherein a phase branch 303 comprises a single converter cell 400 is shown in FIG. 4a. The converter cells 400 of the AC/DC converter 300 shown in FIG. 4a are half-bridge cells 400. In the phase leg 301i of the AC/DC converter 300 of FIG. 4a, the converter cell 400, the cell capacitor 405 and the two valves 215, each comprising a unidirectional switch and an anti-parallel diode, have been indicated by reference numerals.

Figure 4C:
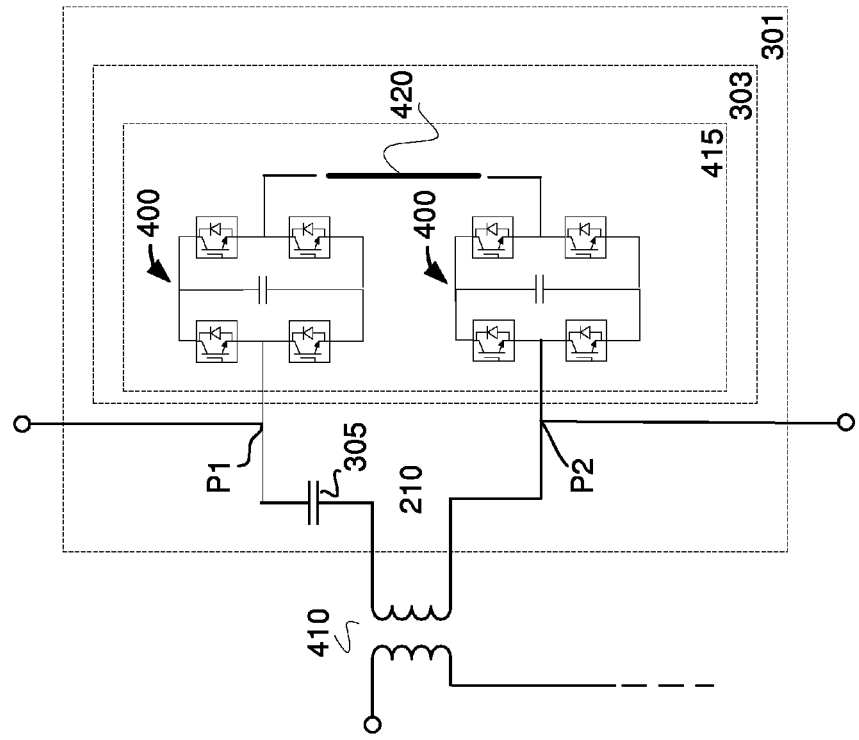
FIG. 4c is a schematic illustration of an embodiment of a phase leg wherein a phase branch comprises a cascade of full-bridge converter cells.
Figure 4B:
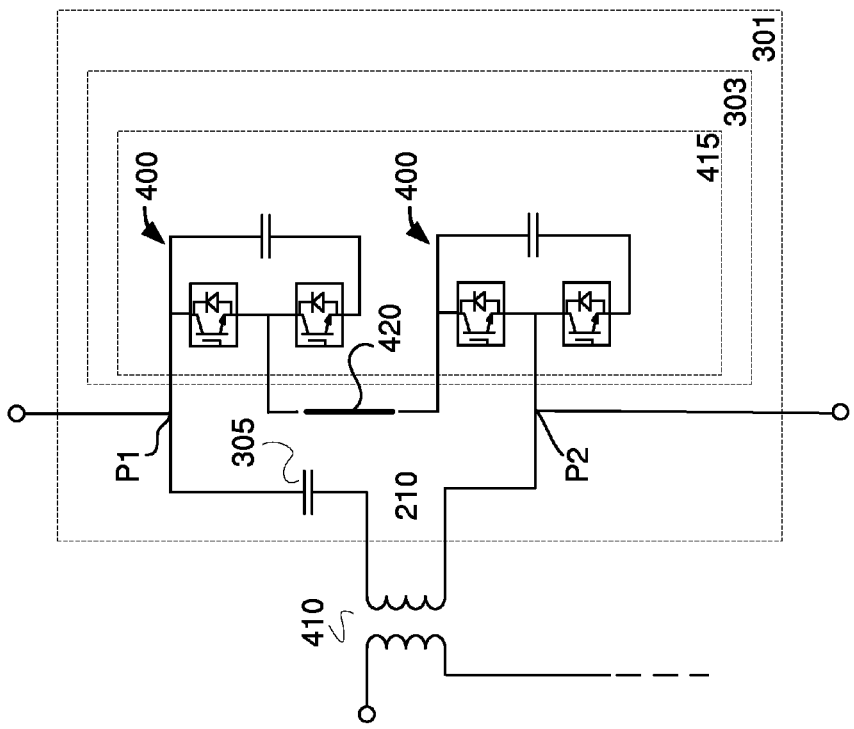
FIG. 4b is a schematic drawing of an embodiment of a phase leg wherein a phase branch comprises a cascade of half-bridge converter cells.

In FIGS. 4b and 4c, examples of different embodiments of a phase legs 301 having a phase branch 303 comprising a cascade 415 of independently switchable converter cells 400 are schematically shown. Two or more phase legs 301 as shown in FIGS. 4b and 4c, respectively, could be series connected on the DC side to form an AC/DC converter 300. In the example of FIG. 4b, the branch 303 comprises a cascade 415 of half-bridge converter cells 400. In FIG. 4c, the branch 303 comprises a cascade 415 of full-bridge converter cells 400. In FIGS. 4b and 4c, two converter cells 400 have been shown for each phase branch 303, with a bold line 420 connecting the two converter cells 400, the bold line indicating that further converter cells 400 may be present in the cascade 415. In fact, a cascade 415 could include a series connection of any number N (N≥2) of half-bridge converter cells 400, or any number (N≥2) of full-bridge converter cells 400, or a combination of half-bridge and full-bridge converter cells 400.

Contact leads can be connected to a half bridge converter cell 400 according to two different topologies: either across the "top" valve, or across the "bottom" valve (for an illustration of a half bridge converter pair comprising two half bridge converter cells of different topology, see any one of FIGS. 10b-10e). Furthermore, the valves of a half bridge converter cell 400 can be of the same, or different, polarity. In a cascade 415, half-bridge cells 400 of the same, or different, topology, and/or of the same, or different, polarity, may be used.

The use of half-bridge converter cells 400 of the same topology and same polarity in a phase branch 303 of an AC/DC converter 300 is often more cost efficient than to use full-bridge converter cells 400, or half-bridge converter cells of different topology and/or different polarity, since less components are required, and a non-zero switching state of a first polarity is normally sufficient. Typically, if only converter cells capable of generating a voltage of the same polarity are included in a phase branch 303, such as half-bridge converter cells 400 of the same topology and polarity, the peak AC phase voltage $\hat{U}^{AC}$ will be limited by $$\hat{U}^{AC} \leq \frac{|U^{DC}|}{P}.$$

If full-bridge converter cells 400 are used, or pairs of half-bridge converter cells 400 capable of generating a voltage of opposite polarity, this restriction does not apply.

In order to improve the current withstanding property of a phase branch 303, two or more cascades 415 could be connected in parallel to form a single phase branch 303.

The AC/DC converters 300 of FIGS. 4a-c are shown to include, for each phase, a transformer 410 which is connected by one of its windings to the AC connection 210 of the phase leg 210. In a three phase AC/DC converter 300, the neutrals of the transformers 410 could be connected in a Y-connection, as shown in FIG. 4a, where the Y-point could be grounded, or floating as discussed in relation to FIG. 9. A Y-connection of the phases would result in less zero sequence current than a Δ-connection, although a Δ-connection could also be contemplated.

An electric valve 215 is shown in FIGS. 4a-c to include a unidirectional switch and an anti-parallel diode, where the unidirectional switch can be controlled to switch off, as well as to switch on. A unidirectional switch could for example be an Integrated Gate Bipolar Transistor (IGBT), an Integrated Gate-Commutated Thyristor (IGCT), a Gate Turn-Off thyristor (GTO), etc. In some implementations, the anti-parallel diode could be integrated in the switch, the switch thus being reverse conducting. Examples of such a reverse conducting switch, which on its own could provide the functionality of a valve 215, are the reverse conducting IGCT and the bi-mode insulated gate transistor (BIGT). Furthermore, an electric valve 215 could comprise more than one switch, connected in series and/or in parallel and arranged to switch simultaneously, and/or more than one anti-parallel rectifying elements.

In FIGS. 4a-4c, the connection point P2 has been shown to lie between the AC connection 210 and the end point E of the phase branch 303 towards which the unidirectional switches are capable of conducting current. However, the connection point P2 could alternatively lie between the AC connection 210 and the end point E of the phase branch 303 towards which the unidirectional switches cannot conduct current. In other words, the capacitor 305 could be located on either side of AC the connection 210 in relation to the direction in which the unidirectional switches of the phase branch 303 is capable of conducting current.

The AC voltage drop $U_{305}^{AC}$ across a DC-blocking capacitor 305 of an AC/DC converter 300 in operation will correspond to:

$$U_{305}^{AC} = \frac{I_{AC}}{2\pi f C_{305}}, \quad (1)$$

where $I_{AC}$ is the magnitude of the AC phase current and $C_{305}$ is the capacitance of the DC-blocking capacitor 305. A suitable capacitance $C_{305}$ can for example be selected based on requirements on the AC impedance provided by the capacitor 305 in for example a ground fault scenario, in combination with capacitor manufacturing costs.

Figure 5:
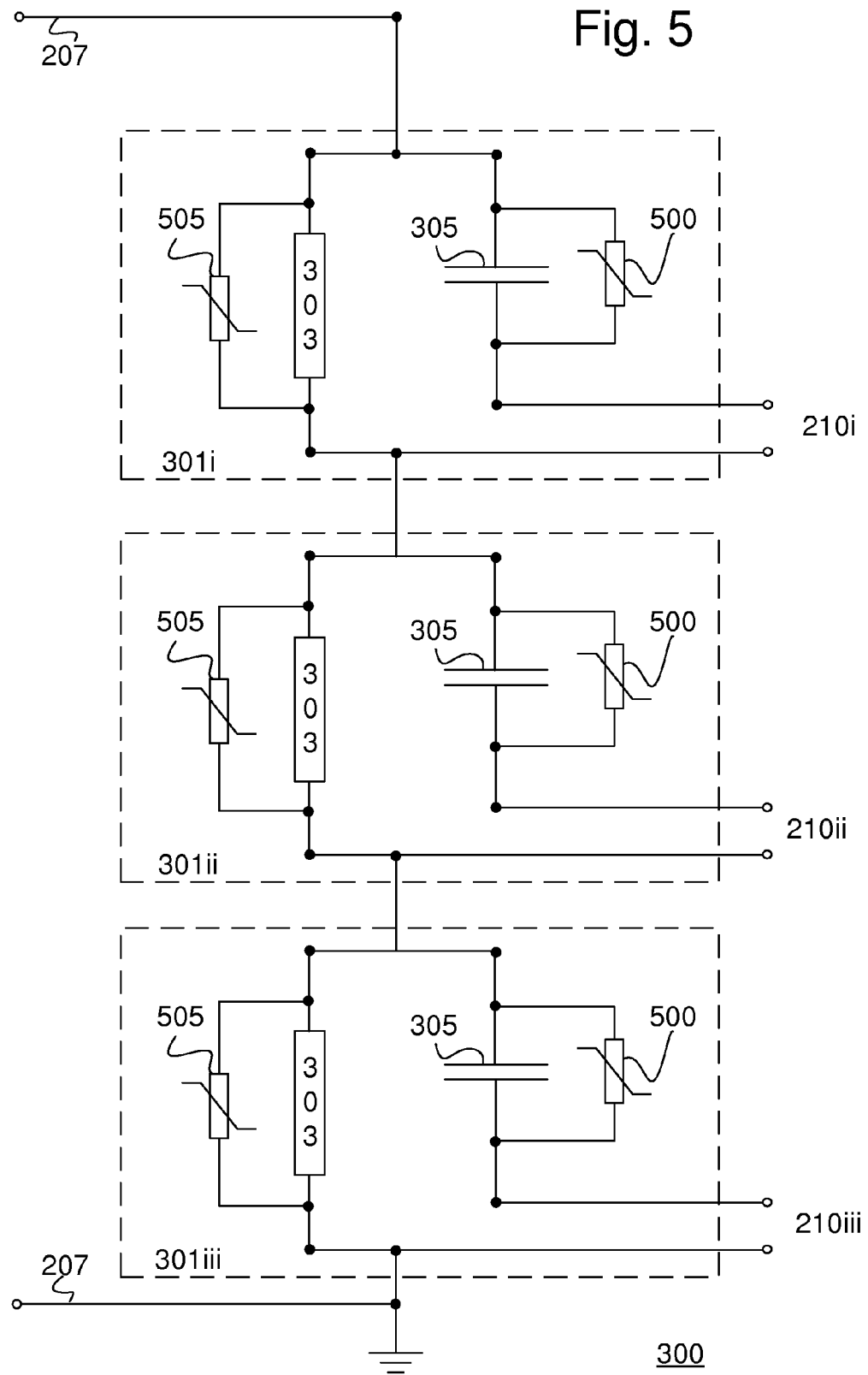
FIG. 5 is a schematic illustration of an embodiment of the AC/DC converter of FIG. 3, wherein an arrester has been connected to protect each of the DC-blocking capacitors as well as each of the phase branches from over voltages.

The DC-blocking capacitor 305 of a phase leg 301 should be designed to withstand at least the expected DC voltage $U_{phase}^{DC}$ (often corresponding to $$\frac{U^{DC}}{P})$$

across the DC-blocking capacitor 305 in addition to the expected AC voltage component $U_{305}^{AC}$. In a short circuit or earth fault situation in a system 100 of which AC/DC converter 300 forms a part, the current through a phase leg 301 could rapidly increase to a considerable value, and could for example reach 10 times the rated AC phase current, where up to half of this current magnitude could be a DC current. Such failure currents could damage the DC-blocking capacitor 305 unless this aspect is considered in the design of the HVDC station 301. Damage of the DC-blocking capacitor 305 may be costly in terms of outage duration, since a damaged DC-blocking capacitor 305 would typically have to be replaced before the HVDC station 301 can operate normally after failure. In order to protect the DC-blocking capacitor 305 from excessive over voltages, an arrester 500 could be connected in parallel to each of the DC blocking capacitors 305, as shown in FIG. 5.

Furthermore, in order to protect the components of the phase branches 303, arresters 505 could similarly be connected in parallel with the phase branches 303. In an implementation wherein an arrester 505 is connected in parallel with a phase branch 303, components having lower voltage withstanding properties could typically be used to form the phase branch 303 than if no arrester 505 was used. Arresters could also be connected across the AC connection 210 and across the cell capacitors 405, if desired.

An arrester 500/505 could for example include one or more elements exhibiting non-linear resistance characteristics such that high current conduction is obtained above a certain voltage level. Such elements could for example be ZnO varistors, or semiconductors exhibiting such non-linear characteristics, e.g. breakover diodes (BODs). The non-linear current-voltage characteristic of the arrester 500/505 could advantageously be chosen so that the arrester 500/505 is highly resistive at any normal operating voltages, whereas at a suitable voltage above of the rated voltage, such as for example at 300% of the rated voltage, the resistance of the arrester 500/505 will drop rapidly, allowing for any break-down current to by-pass the DC-blocking capacitor 305 and/or the phase branch 303.

Figure 6:
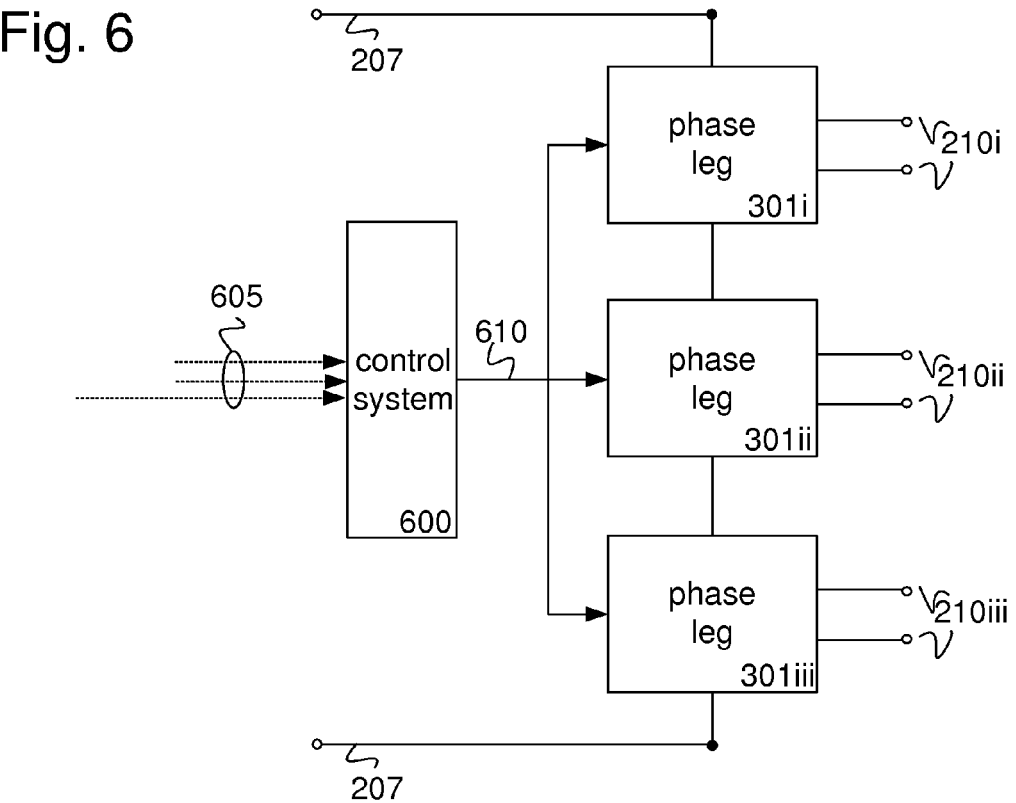
FIG. 6 is a schematic illustration of an AC/DC converter including a control system configured to control the switching of the valves of the AC/DC converter.

An AC/DC converter 300 typically includes a control system arranged to control the switching of the valves 215 of the converter cells 400 in order to arrive at the desired AC and DC voltages. In FIG. 6, an example of a three-phase AC/DC converter 300 including a control system 600 is shown. A control system 600 is typically configured to receive a set of status signals 605, indicative of the status of the AC/DC converter 300, and to control the switching of the valves 215 of the converter cells 400 in dependence of the received status signals 605 so that a suitable status of the switching valves 215 of the AC/DC converter 300 is achieved. Examples of such status signals 605 could be signals indicative of the AC current and AC voltage on the AC connections 210$i$, 210$ii$ and 210$iii$ of the AC/DC converter 300, signals indicative of the DC current and DC voltage on the DC connection 207 of the AC/DC converter 300, etc. The control system 600 is configured to generate a control signal 610 to the converter cells 400 of the AC/DC converter 300 in order to control the valves 215 of the converter cells 400. The control signal 610 could for example comprise a set of pulse width modulated signals. The control signal 610, or a part thereof, is typically fed to gate drives of the converter cells 400.

Under ideal circumstances, the switching of the valves 215 of a phase branch 303 could advantageously be controlled so that the voltage across the phase branch 303, $U_{303}$, varies according to the following expression:

$$U_k = U_k^{DC} + \hat{U}_v^{AC} \sin(\omega t + \Theta_k) \quad (2),$$

where k indicates a particular phase leg 301$k$, k$\in$[1, P], P being the number of phases of the AC/DC converter 300; $U_k^{DC}$ denotes the desired DC voltage between series connection points P1 and P2 of phase where $\Sigma_{k=1}^{P} U_k^{DC} = U^{DC}$, $U^{DC}$ being the voltage across the DC connection 207; $\hat{U}_v^{AC}$ is a desired peak AC voltage across the phase branch 303, t is time, $\omega$ is the desired angular frequency at the AC output and $\Theta_k$ is a desired phase angle $$\left(\theta_k = k\frac{360}{P}\right).$$

The AC component of the controlling function given by expression (2), $\hat{U}_v^{AC} \sin(\omega t + \Theta_k)$, is related to the desired AC phase output $\hat{U}^{AC} \sin(\omega t + \Theta_k)$. Such relationship is dependent on any components, including DC-blocking capacitor 305, connected in series with the AC connection 210 between series connection points P1 & P2 for which the reactance is non-zero, so that the desired AC component is achieved at the AC connection 210. As will be discussed further in relation to FIG. 8, measurements of the voltage at the AC connection 210 of a phase, $\hat{U}^{AC}$, are typically fed back to the control system 600 in order to provide control system 600 with information on how to control the switching of the phase branch 301 in order to arrive at the desired AC component.

$U_k^{DC}$ of expression (1) could take different values for different phase legs 301 of an AC/DC converter 300 as long as $\Sigma_{k=1}^{P} U_k^{DC} = U^{DC}$ is fulfilled. However, by controlling the switching of each phase branch 303 of an AC/DC converter 300 so that the DC voltage component $U_k^{DC}$ equals $$\frac{U^{DC}}{P},$$

the voltages of the phase legs 301 of the AC/DC converter 300 will be balanced. The maximum AC phase voltage will then be the same for all phase legs 301, and the equipment can hence be utilised in the most efficient manner.

When an AC/DC converter 300 is connected in a system 100, the AC/DC converter 300 will be affected by disturbances in the system 100. For example, transient voltages from system 100 can influence the DC voltage across the DC-blocking capacitor 305. As can be seen, for example in FIG. 3, the P DC-blocking capacitors 305 and the P AC connections 210 of the AC/DC converter 300 form a series connection, which is connected across the DC connection 207. Since the DC voltage across the DC connection 207 is typically fixed at a level $U_{DC}$, any deviation from $U_{DC}$ in the sum of the DC-voltages across the P different DC-blocking capacitors 305 will be transferred to one or more of the AC connections 210. A DC voltage component across an AC connection 210 will generate DC currents on the AC side of the AC/DC converter 300. Such DC currents will typically cause problems in terms of saturation of transformers, etc. Hence, it is desired to maintain the sum of the DC voltages across the DC-blocking capacitors 305 at $U^{DC}$, and in order to keep the phases balanced, it is typically also desired to maintain the DC voltage across each DC-blocking capacitor 305 at $$\frac{U^{DC}}{P}.$$

Hence, if the DC voltage across a DC-blocking capacitor 305 is affected by events in system 100, the DC voltage across the phase branch 303, $U_{303}^{DC}$, could advantageously be controlled to take a value which (typically temporarily) differs from $$\frac{U_{DC}}{P}$$

in order to compensate for any disturbances in the DC voltage $U_{305}^{DC}$ across the DC-blocking capacitor 305. Similarly, if unbalanced phase leg voltages are desired, i.e. if $U_k^{DC}$ differs from $$\frac{U_{DC}}{P}$$

for at least two phase legs 301, the DC voltage across the corresponding phase branches 303, $U_{303}^{DC}$, could be controlled to take a value which differs from the desired $U_k^{DC}$ in order to compensate for any disturbances in the DC voltage $U_{305}^{DC}$ across the DC-blocking capacitor 305.

In order to ensure a reliable and stable output from the AC/DC converter 300, the DC voltage across a DC-blocking capacitor 305 could be monitored, and the switching of the converter cells 400 of the phase branch 303 could be controlled so that a desired voltage across the DC-blocking capacitor 305 is maintained. Such desired voltage across the DC-blocking capacitor 305 would typically be the desired DC voltage of the phase leg, $U_k^{DC}$. Typically, the DC voltage across the DC-blocking capacitors 305 of an AC/DC converter 300 should be balanced, and hence, the desired voltage across a DC-blocking capacitor 305 is typically $$\frac{U^{DC}}{P}.$$

Figure 7:
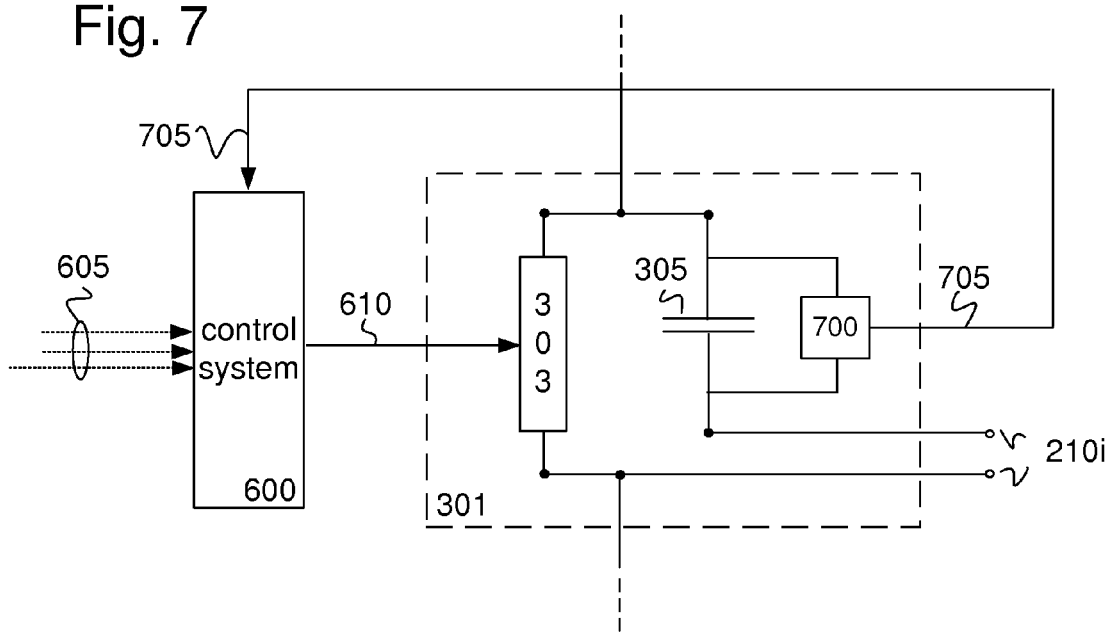
FIG. 7 is a schematic illustration of an embodiment of a phase leg wherein a voltage measurement device is connected to measure the voltage across the DC-blocking capacitor, and to send a signal indicative of such measurements to a control system.

For this purpose, a voltage measurement device could be arranged to measure the voltage across a DC-blocking capacitor 305. The measurement result could then be fed back to the control system 600. FIG. 7 shows an example of an embodiment wherein a voltage measurement device 700 is arranged to measure the voltage across a DC-blocking capacitor 305 of a phase leg 301, and to feed back a capacitor voltage signal 705 to the control system 600. The capacitor voltage signal 705 could be seen as a status signal 605, but will here be treated separately for purposes of illustration.

A voltage measurement device 700 could for example be a resistive voltage divider, or any other suitable type of voltage measurement devices. The voltage measurement device 700 could be provided with analogue to digital conversion, in order to deliver a digital capacitor voltage signal 705, or voltage measurement device 700 could be configured to deliver an analogue capacitor voltage signal 705. Voltage measurement device 700 could for example be connected to control system 600 via an optical transmission link, in order to isolate the control system 600 from the high potential of the capacitor 305. Voltage measurement device 700 could, if desired, include low pass filters for filtering out the AC component of the measured voltage, so that a capacitor voltage signal 705 will be indicative of the DC component of the voltage across the capacitor 305 only. Alternatively, voltage measurement device 700 could be configured to generate a capacitor voltage signal 705 indicative of the measured voltage across the capacitor 305, including AC as well as DC components. Filtering of the capacitor voltage signal 705 could be performed by the control system 600.

In FIG. 7, voltage measurement device 700 is arranged to measure the voltage across the DC-blocking capacitor 305. In an alternative implementation (not shown), a voltage measurement device 700 could be arranged to measure the voltage across the AC connection 210, $U_{210}$, as well as the voltage across the phase branch 303, $U_{303}$. The voltage across the DC-blocking capacitor 305 could then be derived, for example in control system 600, as the difference between $U_{303}$ and $U_{210}$, and a capacitor voltage signal 705 could be generated in dependence of such derived value of $U_{305}$. In yet another alternative implementation, the voltages $U_{405}$ across the cell capacitors 405 of the converter cells 400 of the phase branch 303 could be used, together with information on the current switching states of the valves 215 of a phase branch 303, to derive the voltage $U_{303}$ across the phase branch 303. Since the voltages $U_{405}$ are often required by the control system 600 for other purposes, and the switching states of the valves 215 are known to control system 600, this is typically an efficient way of determining the voltage $U_{303}$ across a phase branch 303.

Figure 8:
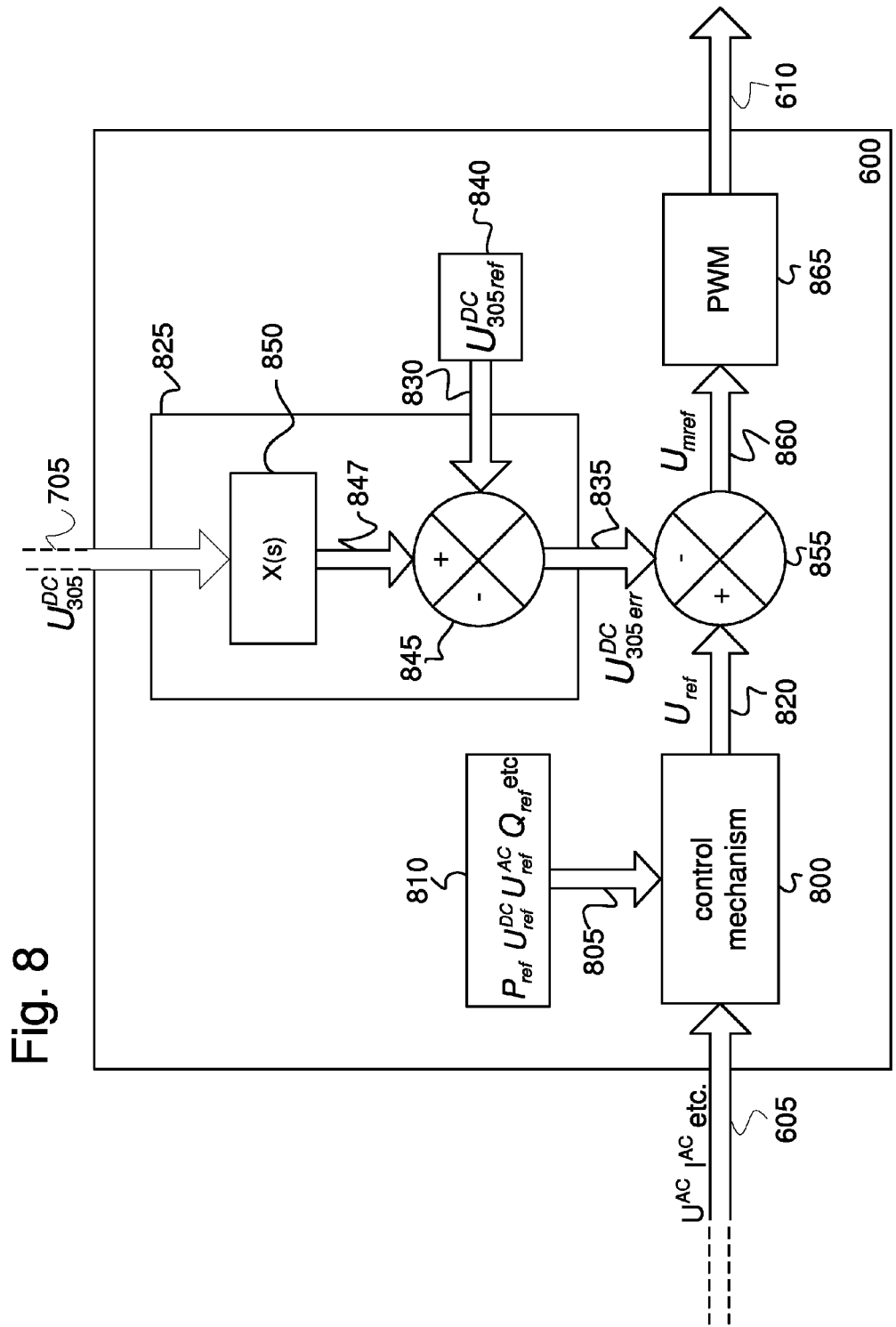
FIG. 8 is a schematic illustration of an embodiment of a control system configured to control the switching of the valves of a phase leg, whereby the voltage across the DC-blocking converter can be controlled.

FIG. 8 schematically illustrates an example of an embodiment of the control system 600 whereby the voltage across the DC-blocking capacitor 305 may be stabilised in an AC/DC converter 300 of the voltage source converter (VSC) type. The control system 600 of FIG. 8 comprises a control mechanism 800, which is configured to generate a reference converter voltage waveform, $U_{ref}$, in dependence of a set of status signals 605 and a set of reference signals 805, where the reference signals 805 are indicative of the reference voltage waveform, given for example by expression (2). The status signal 605 could for example include signals indicative of measurements of the AC current $I^{AC}$ on the AC phases of the AC/DC converter 300, the AC voltage $U^{AC}$ at the AC connections 210, the DC voltage $U^{DC}$ at the DC connection 207, and/or measurements of any other suitable parameters. The set of reference signals could for example include signals indicative of a reference value for the converter phase AC voltage ($U_{ref}^{AC}$), for the converter active power ($P_{ref}$), for the DC voltage at the DC connection 207 ($U_{ref}^{DC}$), for the converter reactive power ($Q_{ref}$), and/or any other suitable reference value. The reference values could for example be stored in a memory 810.

The control mechanism 800 could be configured to generate the reference converter voltage waveform $U_{ref}$ in a known manner, for example as described in M. Khatir, S. A. Zidi, A. Hadjeri and M. K. Fellah, "*Dynamic performance of a back-to-back hvdc station based on voltage source converters*", *Journal of Electrical Engineering*, vol. 61, no. 1, pages: 29-36, 2010, and to generate a signal 820 indicative of $U_{ref}$.

Control system 600 of FIG. 8 further comprises a capacitor-DC-voltage correction mechanism 825, configured to generate a DC voltage error signal 835 in dependence of a DC voltage reference signal 830 and the capacitor voltage signal 705 indicative of the measured or derived DC voltage across the DC-blocking capacitor 305. The DC voltage reference signal 830 is indicative of the desired DC voltage $U_{305ref}^{DC}$ across the DC blocking capacitor 305. DC voltage error signal 835 is indicative of a DC voltage error ($U_{305err}^{DC}$, which represents the deviation of the DC voltage across the DC-blocking capacitor 305 from the desired (reference) DC voltage, $U_{305ref}^{DC}$. A value of the reference capacitor DC voltages $U_{305ref}^{DC}$ could for example be stored in a memory 840 (which could, if desired, be the same memory as memory 810).

Capacitor-DC-voltage correction mechanism 825 comprises a subtractor 845, configured to subtract the reference capacitor DC voltage $U_{305ref}^{DC}$ from a signal 847, which is based on received measurement(s), and to generate a DC voltage error signal 835 indicative of this difference. In the embodiment shown in FIG. 8, the capacitor-DC-voltage correction mechanism 825 further comprises a stabilizing controller 850, which is configured to receive and stabilize the capacitor voltage signal 705 and to deliver, to the subtractor 845, a signal 847 indicative of the stabilized capacitor voltage signal. Stabilizing controller 850 could for example be a stabilizing controller with a proper gain, such as for example PI controller. In an alternative implementation, the capacitor voltage signal 705 could be applied directly to the subtractor 845 as signal 847. In such implementation, the stabilizing controller 850 could be omitted, or configured to receive and stabilize the DC voltage error signal 835.

The sum over the reference capacitor DC voltages of all phases of the DC-blocking capacitors $\Sigma_1^P U_{305ref,P}^{DC}$ should advantageously equal the voltage $U^{DC}$ across the DC connection 207. In order to have the phase leg voltages balanced, it is often desirable that $$U_{305ref}^{DC} = \frac{U^{DC}}{P}$$

for each phase.

In the configuration shown in FIG. 8, it is assumed that capacitor voltage signal 705 has been low-pass filtered so that the AC components have been removed. If the capacitor voltage signal 705 received by control system 600 includes AC voltage components, control system 600 could include a suitable low pass filter for singling out the DC component.

In order to take the measured DC voltage across the DC-blocking capacitor 305 into account in the switching of the valves 215 of a phase branch 303, the control system 600 is provided with a subtractor 855, which is configured to receive the signal 820 indicative of the reference converter voltage waveform $U_{ref}$, as well as the DC voltage error signal, $U_{305err}^{DC}$. Subtractor 855 is further configured to subtract a received value of $U_{305err}^{DC}$ from a received value of $U_{ref}$, to arrive at a modified reference converter voltage waveform $U_{mref}$, and to generate a modified voltage reference signal 860 indicative of $U_{mref}$.

Control system 600 of FIG. 8 further comprises a pulse width modulator (PWM) 865, which is configured to generate a set of pulse width modulated signals in response to a voltage reference signal (which in control system 600 of FIG. 8 is the modified voltage reference signal 860). The pulse width modulator 865 could operate in a known manner (see e.g. N. Mohan, T. Undeland, W. Robbins: "*Power electronics*", section 8-4-6-2, John Wiley & sons) to generate a control signal 610 in the form of a set of PWM signals to be fed to the phase leg 301 for the control of its valves 215.

The control system 600 is responsively connected to the voltage measurement device 700, as well as to further measurement devices (not shown) arranged to provide status signals 605, and configured to generate a control signal 610 to be used in the control of the AC/DC converter 300 in response to the capacitor voltage signal 705 and status signals 605 received from such measurement devices. The control system 600 of FIG. 8 is an example only, and other implementations of a control system 600 wherein measurements of the DC voltage across the DC-blocking capacitor 305 are taken into account in the control of the AC/DC converter 300 can be employed.

Generally, the sum of the voltages across the P series connected phase legs 301 should preferably be equal to a DC voltage applied across the DC connection 207. This implies that the zero sequence component of the output AC voltage should equal zero. In other words, the instantaneous sum of the voltage at the AC connections 210*i*, 210*ii* and 210*iii* should equal zero. However, for example due to ripple voltages occurring across the cell capacitors 405 of the converter cells 400 in the phase branches 303, a non-zero zero sequence component may arise, which will yield parasitic common mode currents. Such parasitic common mode currents can be harmful to the HVDC system 100. They may for example be mitigated by means of passive control, using passive filters as described below, and/or by means of actively controlling at least one converter cell 400 to generate a voltage opposite to the unwanted zero sequence component.

Measurements of current flowing through the DC connection 207 as well as measurements of the sum of the voltages across the P AC connections 210, can be indicative of a non-zero zero sequence component. Hence, a signal indicative of the zero sequence components can be generated from such measurements, and can be used on the mitigation or elimination of parasitic common mode currents. The zero sequence component contribution $U_{zsc}$ which can be identified by such measurement often represents harmonic components of the desired AC voltage:

$$U_{ZSC} = \sum_{h=2}^{n} \hat{U}_h \sin(h\omega t - \varphi_h), \quad (3)$$

where h=2, ..., n represent n-1 harmonic components, and $\hat{U}_h$ is the peak voltage for the $h^{th}$ harmonic. The harmonic components can for example be harmonics of the valve switching frequency, or harmonics of the frequency of the AC system 115. In the following, the term "DC side common mode harmonic current components" is used to refer to such parasitic DC current components.

In one embodiment of active common mode current control, the control of the converter cells 400 of the phase branches 303 takes the measured zero sequence component contribution $U_{zsc}$ into account. If the control system 600 shown in FIG. 8 is employed, such active common mode current control could for example be implemented by providing the subtractor 855 with a signal representing the zero sequence component contribution $U_{zsc}$, so that a modified reference converter voltage waveform $U_{mref}$ to be fed to the pulse width modulator 865, is generated in a manner by which the unwanted zero sequence component contribution $U_{zsc}$ will be eliminated or mitigated. Thus, the modulation of the output from the phase branches 303 will be performed in a manner so that the unwanted zero sequence component contribution $U_{zsc}$ is mitigated, and hence, DC side common mode harmonic current components will be mitigated. Typically, the same contribution will be subtracted from the reference voltage waveform $U_{ref}$ for each of the P phases, where such contribution can often be described by expression (3).

Figure 9:
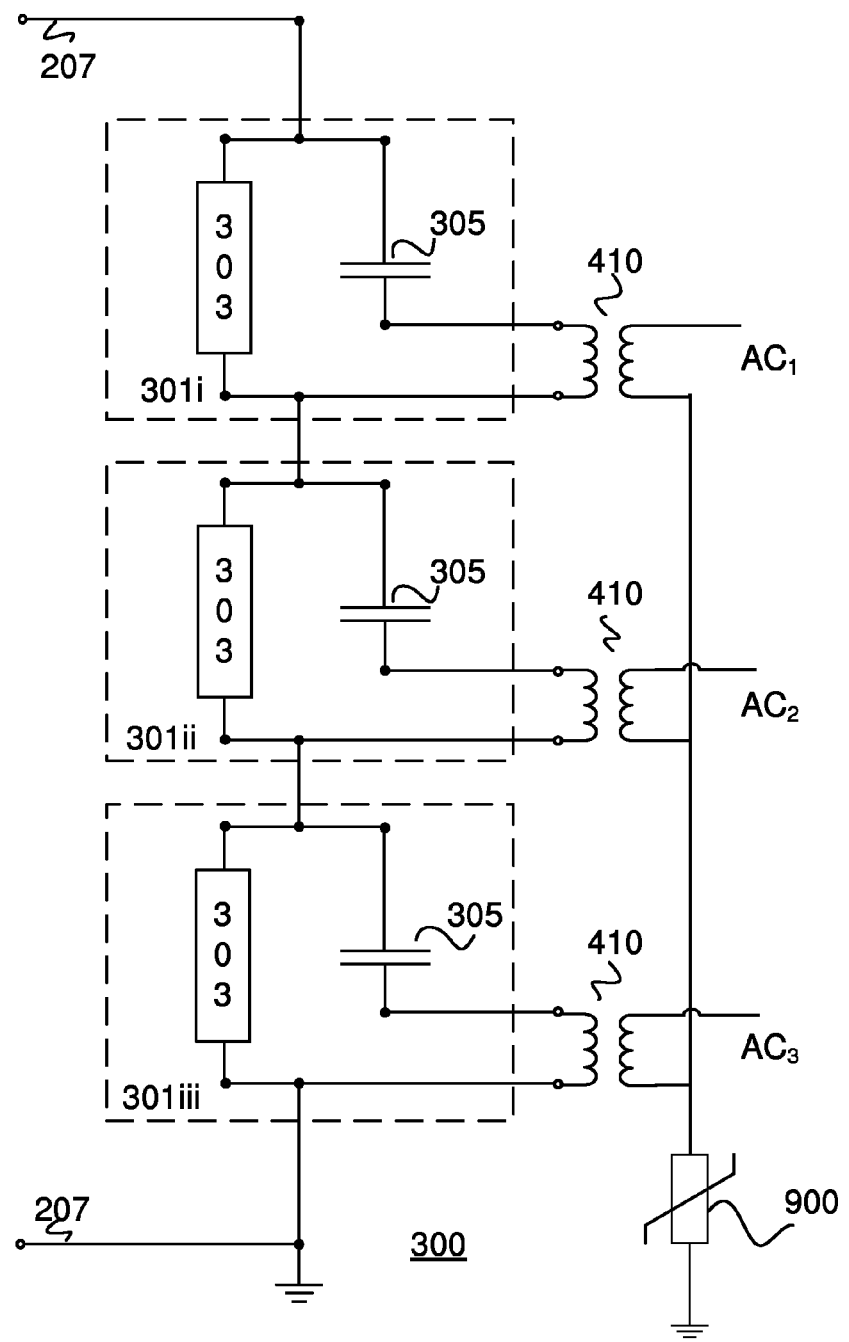
FIG. 9 is a schematic illustration of an embodiment of the AC/DC converter of FIG. 3, wherein the AC connection of each phase is connected to a transformer, and wherein the neutrals of the AC-side transformer windings are arranged to be floating.
Figure 10B:
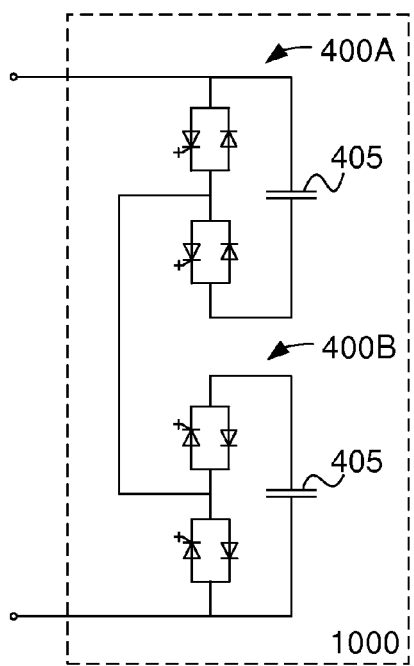
Figure 10C:
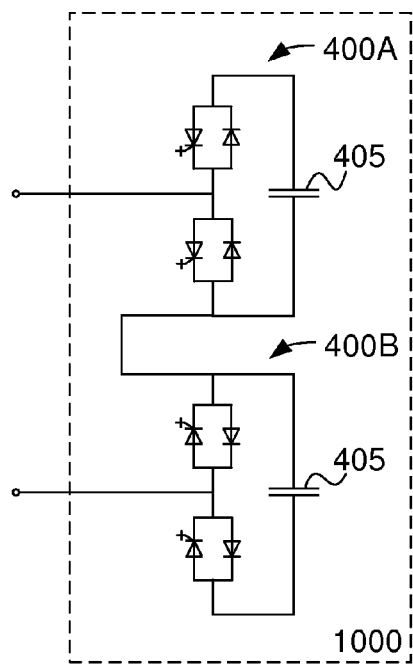
Figure 10D:
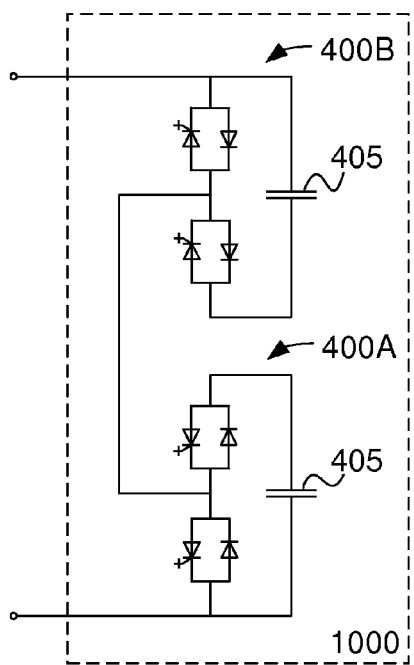
Figure 10E:
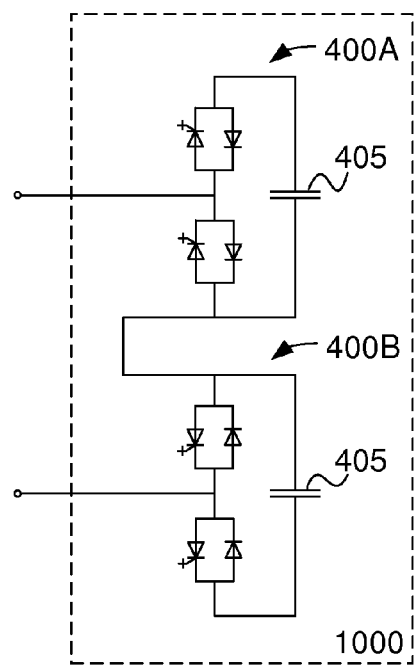

However, when active common mode current control is performed by means of the converter cells 400 of the phase branches 303 in a AC/DC converter 300 wherein only a single phase branch 303 per phase leg 301 is present, the contribution in the modulation of the phase branch output from the mitigation of the unwanted zero sequence component may, in some configurations, show up in the voltage output at the AC connections 210. Therefore, it is proposed that in this embodiment, a transformer 410 connected to the AC output 210 of a phase leg 301 is provided with a floating neutral point, as shown in FIG. 9, where the neutral Y-points of the transformers 410 have been connected to ground via an arrester 900. Voltages caused by common mode current mitigation modulation on the AC connection 210 of a phase leg 210 will in this configuration appear across the arrester 900, and will hence not be transferred to the AC system 115.

The arrester 900 has non-linear resistance characteristics such that for potentials expected at the neutral points of the transformers during normal operation, the resistance of arrester 900 is typically very high, basically keeping the transformer neutrals at a floating potential, while for voltages expected upon any short-circuit or ground fault in system 100, the arrester will show high current conduction. An arrester 900 could for example include one or more varistors of a suitable material such as ZnO, or semiconductors exhibiting the desired non-linear resistance characteristics, e.g. break-over diodes (BODs).

Active common mode current control could alternatively be performed by means of an active filter 1000, comprising additional converter cells 400, the active filter 900 being connected in series with the phase legs 301 of an AC/DC converter 300. By means of such active filter 1000, any non-zero zero sequence components giving rise to parasitic DC side common mode currents could be compensated for, thus mitigating or eliminating the parasitic DC side common mode currents. An example of an AC/DC converter 300 comprising such active filter 1000 is shown in FIG. 10a. The filter 1000 of FIG. 10a is connected between the most positive DC pole of DC connection 207 and the phase leg 301i which is nearest to the positive DC pole. However, a filter 1000 could alternatively be connected between two phase legs 301, or between the most negative DC pole of DC connection 207 and the phase leg 301 which is nearest to the negative DC pole. When a filter 1000 comprises more than one converter cell 400, the filter 1000 could alternatively be distributed so that different converter cells 400 of filter 1000 are connected at different locations along the series connection of phase legs 301 between the two DC poles of DC connection 207.

Different examples of implementations of an active filter 1000 are shown in FIGS. 10b-10f. Some alternative configurations of a half-bridge pair comprising half-bridge cells 400 of different topologies and opposite polarities are shown in FIGS. 10b-10e. Active filters 1000 of FIGS. 10b-e are made up of two half-bridge converter cells 400 of different topologies and opposite polarities, wherein the voltage across one of the top converter cell 400A and the bottom converter cell 400B can take one of the values 0 or $U_{405}$, while the voltage across the other converter cell of the pair can take one of the values 0 or $-U_{405}$, where $U_{405}$ is the voltage across the cell capacitor 405. Hence, the voltage across the active filters 1000 shown in FIGS. 10b-e, i.e. the active filter voltage $U_{1000}$, can take any of the values $U_{405}$, 0 or $-U_{405}$.

Active filter 1000 of FIG. 10f is made up of a full-bridge converter cell 400, so that the active filter voltage $U_{1000}$ can take any of the values $U_{405}$, 0 or $-U_{405}$. An active filter 1000 can include further converter cells 400, depending on the expected compensation voltage required from the active filter 1000. Since generally, no DC component is desired in the active filter voltage $U_{1000}$, the active filter 1000 should preferably be made up of full-bridge converter cells 400 and/or half-bridge converter cell pairs connected such that both a positive and a negative voltage can be achieved across the converter pair.

The control of the switching of the valves 215 of an active filter 1000 could advantageously be performed such that the active filter voltage $U_{1000}$ is generated to correspond to $-U_{zsc}$, where $U_{zsc}$ represents measurement results of the zero sequence component (obtained for example by current flowing through the DC connection 207 as well as measurements of the sum of the voltages across the P AC connections 210). Such control could be performed by control system 600, which could for example have a separate module for controlling the active filter 1000. Such module could for example operate in a similar manner to subtractor 855 and pulse width modulator 865 of FIG. 8, where $U_{ref}$ would be a signal representing zero and the subtractor 855 would be fed with a signal representing the identified zero sequence component that the active filter 1000 should compensate for.

Figure 11:
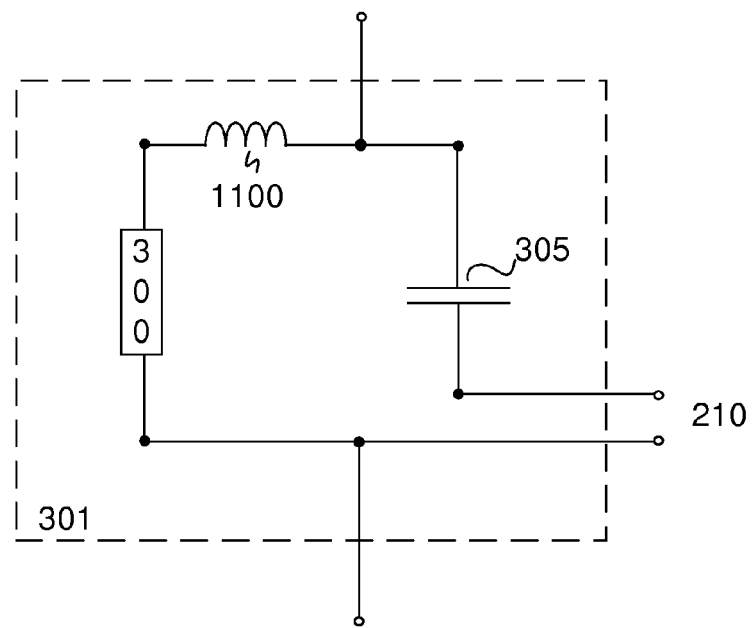
FIG. 11 is a schematic illustration of a phase leg having a passive filter connected in series with the phase branch.

As mentioned above, parasitic common mode currents could alternatively be mitigated by means of passive filters, such as reactors or passive filters comprising more than one component. If passive filters of more than one component are used, such passive filters could for example be designed to particularly suppress currents at the frequencies of the most commonly occurring harmonic components. Since the common mode currents are often driven by ripple voltages occurring within the converter cells 400 of the phase branches 303, such passive filters could advantageously be series connected with the phase branches 303. FIG. 11 shows a phase leg 301 having a reactor 1100 connected in series with the phase branch 303, where such series connection is connected in parallel with the DC-blocking capacitor 305 and the AC connection 210. A passive filter connected in this manner will be referred to as a phase branch filter 1100, of which reactor 1100, here referred to as a phase branch reactor 1100, forms an embodiment.

A DC line filter 310, connected in series with the phase legs and the DC connection 207, could also contribute to the passive mitigation of common mode currents.

The phase branch filter 1100, which provides passive mitigation of common mode currents, can furthermore protect the phase leg 301 from short circuit or earth fault currents originating from the HVDC system 100. The reactance of the phase branch filter 1100, $X_{1100}$, contributes to the DC-side reactance $X_{DC}$: $X_{DC}=X_{310}+P \cdot X_{1100}$ (which amounts to $X_{DC}=2\pi f \cdot L_{310}+2\pi f \cdot P \cdot L_{1100}$ when the filters are formed of a reactor 310 and 1100 having inductances $L_{310}$ and $L_{1100}$, respectively).

As opposed to the DC line filter 310, a phase branch filter 1100 further contributes to the reactance $X_{301}$ of the phase leg circuit formed by the parallel connection of the series connection of the DC-blocking capacitor & the AC connection 210 and the phase branch 303. In case of an excessive short circuit or earth fault current from the HVDC system 100 to which the AC/DC converter 300 is connected, it may be that the DC-blocking capacitor 301 may not be able to withstand the current, and that a current discharge through the DC-blocking capacitor, or via an arrester 500, if any, occurs. The current increase rate in the phase leg circuit in such a situation will depend on the phase leg circuit reactance $X_{301}$, and in order to protect the converter cells in phase branch 303 from high transient currents, it is desirable to design the phase leg circuit reactance in a suitable manner. A phase branch filter 1100 can be useful in such design. Depending on the requirements of a particular implementation, the use of phase leg circuit filters 310 could eliminate the need for a DC line filter 310.

Figure 12:
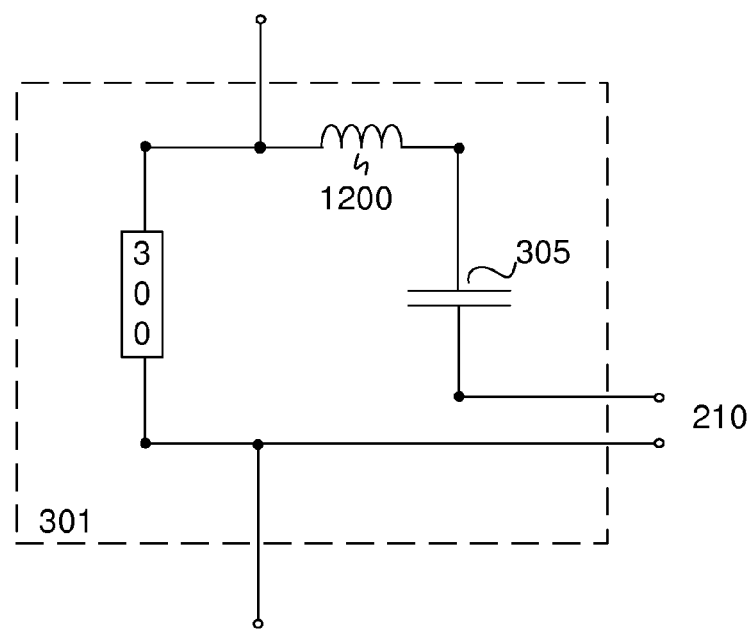
FIG. 12 is a schematic illustration of a phase leg having a passive filter connected in series with the DC-blocking capacitor and the AC connection.

The phase leg circuit reactance $X_{301}$ may alternatively (or additionally) be designed by connecting an AC connection branch filter 1200 in series with the DC-blocking capacitor 305 and the AC connection 210, as shown in FIG. 12, where the AC connection branch filter 1200 is represented by a reactor 1200. Such AC connection branch filter 1200 will not contribute to the DC line reactance 310. Any combination of a DC line filter 310, phase branch filters 1100 and/or AC connection branch filters 1200 may be employed to design a suitable passive protection of the AC/DC converter.

If the DC voltage drop across a filter 1200 (or across any other component connected in series with the DC-blocking capacitor 305 and the AC connection 210 of a phase leg 210) is significant, such DC voltage drop can, for purposes of control described in relation to FIG. 8, be seen as a part of the DC voltage across the DC-blocking capacitor 305, $U_{305}$.

By the present invention it is achieved that an efficient AC/DC converter can be obtained at reduced cost with maintained performance compared to existing solutions. For example, the current rating of converter cell valves can be halved at maintained power rating compared to an AC/DC converter having series connected phase legs, each having a single phase branch and a parallel connected DC capacitor branch, and wherein an AC phase output is provided between the midpoints of a phase branch and a DC capacitor branch of a phase leg. Compared to an AC/DC converter having two parallel branches, the midpoints of which are connected to an AC connection, the number of valves required can be halved at maintained power rating, with maintained voltage rating of the valves. Thus, the total voltage rating of the AC/DC converter can be halved. The invention is particularly advantageous for tapping converters in high voltage applications, but may equally well be applied in low or medium voltage applications, or in AC/DC converters forming main converters in an HVDC system. In the above, AC/DC converters of three phases have been given as examples. However, the technology is equally well applicable to AC/DC converters of any number of phases P, where P≥2. The disclosed invention is particularly advantageous for AC/DC converters of the voltage source type, so called VSC converters.

Although various aspects of the invention are set out in the accompanying independent claims, other aspects of the invention include the combination of any features presented in the above description and/or in the accompanying claims, and not solely the combinations explicitly set out in the accompanying claims.

One skilled in the art will appreciate that the invention presented herein is not limited to the embodiments disclosed in the accompanying drawings and the foregoing detailed description, which are presented for purposes of illustration only, but it can be implemented in a number of different ways, and it is defined by the following claims.

The invention claimed is:

1. An AC/DC converter comprising:
   at least two phase legs connected in series between first and second DC connection terminals of the AC/DC converter, wherein each phase leg comprises:
   an AC connection having first and second AC connection terminals arranged to connect the phase leg to a phase of an AC system;
   a phase branch comprising at least one converter cell and having first and second branch end terminals; and
   a capacitor; wherein
   the capacitor is connected between the first branch end terminal and the first AC connection terminal, the capacitor forming a DC blocking capacitor;
   the second AC connection terminal is connected to the second branch end terminal; and wherein
   the series connection of the phase legs between first and second DC connection terminal is such that a first series connection point in a phase leg is located between the first branch end terminal and the DC-blocking capacitor, while a second series connection point is located between the second branch end terminal and the second AC connection terminal such that the second AC connection terminal is connected to the second branch end terminal via the second series connection point.

2. The AC/DC converter of claim 1, wherein
   the phase branch of each phase leg comprises a cascade of at least two series connected and independently switchable converter cells.

3. The AC/DC converter of claim 2,
   the phase branch of each phase leg comprises at least two parallel connected cascades of converter cells.

4. The AC/DC converter of claim 2, further comprising
   a control system configured to control the switching of the converter cells of the phase branch of a phase leg to provide a voltage according to the following expression between the first and second series connections points of a phase leg:

$$U_k = U_k^{DC} + \hat{U}_v^{AC} \sin(\omega t + \Theta_k),$$

where k indicates the $k^{th}$ phase leg, k∈[1, P], P being the number of phases of the AC/DC converter 300; $U_k^{DC}$ denotes a predetermined desired DC voltage between the first and second connection points, where $$\sum_{k=1}^{p} \overset{DC}{\underset{k}{U}} = U^{DC}, U^{DC}$$

being the voltage between the DC connection terminals; $\hat{U}_v^{AC}$ is a desired peak AC voltage between the first and second connection points, t is time, ω is the desired angular frequency at the AC output and $\Theta_k$ is the desired phase angle.

5. The AC/DC converter of claim 2, further comprising:
a voltage measurement device arranged to measure at least one voltage from which the DC voltage across the DC-blocking capacitor of the phase leg may be obtained; and wherein
a control system is responsively connected to the voltage measurement device and configured to receive a signal from the voltage measurement device from which the DC voltage across the DC-blocking capacitor may be obtained; and
the control system is configured to perform the control of the switching of the converter cells of the phase branches in dependence of the received voltage measurement signals so that the DC voltage across the DC-blocking capacitor of a phase leg corresponds to a predetermined capacitor DC voltage.

6. The AC/DC converter of claim 4, wherein
the predetermined desired DC voltage corresponds to $$\frac{U^{DC}}{P},$$

where $U^{DC}$ is the voltage between the DC connection terminals and P is the number of phases.

7. An AC/DC converter comprising:
at least two phase legs connected in series between first and second DC connection terminals of the AC/DC converter, wherein each phase leg comprises:
an AC connection having first and second AC connection terminals arranged to connect the phase leg to a phase of an AC system;
a phase branch comprising at least one converter cell and having first and second branch end terminals;
a capacitor, wherein
the capacitor is connected between the first branch end terminal and the first AC connection terminal, the capacitor forming a DC blocking capacitor;
the second AC connection terminal is connected to the second branch end terminal; and wherein
the series connection of the phase legs between first and second DC connection terminal is such that a first series connection point in a phase leg is located between the first branch end terminal and the DC-blocking capacitor, while a second series connection point is located between the second branch end terminal and the second AC connection terminal;
a voltage measurement device arranged to measure at least one voltage from which the DC voltage across the DC-blocking capacitor of the phase leg may be obtained; and wherein
a control system is responsively connected to the voltage measurement device and configured to receive a signal from the voltage measurement device from which the DC voltage across the DC-blocking capacitor may be obtained; and
the control system is configured to perform the control of the switching of the converter cells of the phase branches in dependence of the received voltage measurement signals so that the DC voltage across the DC-blocking capacitor of a phase leg corresponds to a predetermined capacitor DC voltage.

8. The AC/DC converter of claim 7, wherein
the voltage measurement device is configured to measure the voltage across the DC-blocking capacitor.

9. The AC/DC converter of claim 7, wherein
the voltage measurement device is configured to measure:
at least one voltage whereby the voltage across the phase branch of the phase leg may be obtained, and
the voltage across the AC connection of the phase leg.

10. The AC/DC converter of claim 1, further comprising
a control system configured to control the switching of the converter cells of the phase branch of a phase leg, wherein the control system is configured to:
receive a signal indicative of a zero sequence component of the AC output voltage from the AC/DC converter; and
control the switching of at least one converter cell of the AC/DC converter in dependence of said signal indicative of a zero sequence component so as to mitigate DC side harmonic common mode current components.

11. The AC/DC converter of claim 8, wherein
the at least one converter cell which the control system is configured to control the switching to mitigate DC side harmonic common mode current components are the converter cells of the phase branches of the phase legs.

12. The AC/DC converter of claim 10, wherein
the at least one converter cell which the control system is configured to control the switching to mitigate DC side harmonic common mode current components is part of an active filter connected in series with the phase legs between the terminals of the DC connection.

13. The AC/DC converter of claim 11, wherein
the AC connection of each phase leg is connected to a first winding of a transformer; and
the neutral of the second winding of the transformer is connected to a grounded arrester, the neutral thus being floating.

14. The AC/DC converter of claim 1, wherein
a passive filter is connected, between the first and second series connection points of a phase leg, in series with the phase branch.

15. The AC/DC converter of claim 1, wherein
a passive filter is connected, between the first and second series connection points of a phase leg, in series with the DC-blocking capacitor.

16. The AC/DC converter of claim 1, wherein the second series connection point is directly connected to the second AC connection terminal.

17. The AC/DC converter of claim 1, wherein the second series connection point, the second branch end terminal, and the second AC connection terminal are substantially equipotential.

18. A method of operating an AC/DC converter having at least two phase legs connected in series, wherein each phase leg comprises:
an AC connection having first and second AC connection terminals arranged to connect the phase leg to a phase of an AC system;
a phase branch comprising at least one converter cell and having first and second branch end terminals; and
a capacitor; wherein the capacitor is connected between the first branch end terminal and the first AC connection terminal, the capacitor forming a DC blocking capacitor;

the second AC connection terminal is connected to the second branch end terminal; and the series connection of the phase legs between first and second DC connection terminal is such that a first series connection point in a phase leg is located between the first branch end terminal and the DC-blocking capacitor, while a second series connection point is located between the second branch end terminal and the second AC connection terminal; the method comprising:

controlling the switching of the converter cells of the phase branch of a phase leg to provide a voltage according to the following expression between the first and second series connections points of a phase leg:

$$U_k = U_k^{DC} + \hat{U}_v^{AC}\sin(\omega t + \Theta_k),$$

where k indicates the $k^{th}$ phase leg, $k \in [1, P]$, P being the number of phases of the AC/DC converter 300; $U_k^{DC}$ denotes a predetermined desired DC voltage between the first and second connection points, where $$\sum_{k=1}^{P} U_k^{DC} = U^{DC}, U^{DC}$$

being the voltage between the DC connection terminals; $\hat{U}_v^{AC}$ is a desired peak AC voltage between the first and second connection points, t is time, $\omega$ is the desired angular frequency at the AC output and $\Theta_k$ is the desired phase angle.

19. The method of claim 18 further comprising, for each phase leg:

measuring at least one voltage from which the DC voltage across the DC-blocking capacitor of the phase leg may be obtained; and controlling the switching of the converter cells of the phase branch in dependence of the received voltage measurement signal so that the DC voltage across the DC-blocking capacitor of the phase leg corresponds to the predetermined desired DC voltage.

20. The method of claim 18, further comprising:

measuring a quantity indicative of a zero sequence component of the AC output voltage from the AC/DC converter;

controlling the switching of at least one converter cell of the AC/DC converter in dependence of said measured quantity in a manner so as to mitigate DC side common mode harmonic current components.

21. The method of claim 20, wherein the at least one converter cell which is controlled in a manner so as to mitigate DC side common mode harmonic current components is part of an active filter which is connected in series with the phase legs.

22. The method of claim 20, wherein the at least one converter cell which is controlled in a manner so as to mitigate DC side common mode harmonic current components are the converter cells of the phase branches of the phase legs.

* * * * *